(12) United States Patent
Hibi et al.

(10) Patent No.: US 7,099,079 B2
(45) Date of Patent: Aug. 29, 2006

(54) DIFFUSER PANEL FOR REAR PROJECTION SCREEN AND SUCH REAR PROJECTION SCREEN

(75) Inventors: Taketoshi Hibi, Tokyo (JP); Yuzo Nakano, Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 84 days.

(21) Appl. No.: 10/801,601

(22) Filed: Mar. 17, 2004

(65) Prior Publication Data

US 2005/0002095 A1   Jan. 6, 2005

(30) Foreign Application Priority Data

Jul. 1, 2003   (JP) .............................. 2003-189483

(51) Int. Cl.
*G03B 21/60* (2006.01)
(52) U.S. Cl. .............. 359/460; 359/457; 359/449; 359/454; 359/459
(58) Field of Classification Search ................ 359/457, 359/449, 454, 459–460
See application file for complete search history.

(56) References Cited

U.S. PATENT DOCUMENTS 4,468,092 A * 8/1984 Inoue et al. ................ 359/457
4,708,435 A * 11/1987 Yata et al. .................. 359/456
5,880,887 A    3/1999 Goto .......................... 359/626
6,788,460 B1* 9/2004 Knox et al. ................. 359/456

FOREIGN PATENT DOCUMENTS

| JP | 58-163930 A | 9/1983 |
| JP | 9-120102 A | 5/1997 |
| JP | 10-111537 A | 4/1998 |
| JP | 2002-174703 A | 6/2002 |
| JP | 2002-196422 A | 7/2002 |
| JP | 2002-311211 A | 10/2002 |

* cited by examiner

*Primary Examiner*—W. B. Perkey
*Assistant Examiner*—Magda Cruz
(74) *Attorney, Agent, or Firm*—Birch, Stewart, Kolasch & Birch, LLP (57) ABSTRACT

A plurality of reflecting mirrors (322) extending in the vertical direction of a screen are provided in parallel as appropriate between a light incident surface and a light exiting surface. The reflecting mirrors (322) each have a shape of parabolic cylinder, for condensing light on substantially one line. Light rays (L2) are reflected from a concave mirror part on the inner surface of one of the reflecting mirrors (322), and are reflected again from a convex mirror part of an adjacent one of the reflecting mirrors (322), to be emitted to the outside. Being reflected from the inner surface of one of the reflecting mirrors (322), the light rays (L2) are condensed on a predetermined focal point (FP1), and are then emitted while diffusing. Thus obtained is a diffuser panel for a rear projection screen capable of contributing to improved clarity of images.

17 Claims, 10 Drawing Sheets

DIFFUSER PANEL FOR REAR PROJECTION SCREEN AND SUCH REAR PROJECTION SCREEN

BACKGROUND OF THE INVENTION

1. Field of the Invention

The present invention relates to a technique applied to projection televisions, for correcting the direction of travel of light rays projected from the rear side to thereby enlarge the viewing angle of images.

2. Description of the Background Art

A television such as a projection television is constructed such that a rear projection screen corrects the direction of travel of light projected from a projection device so that projected light rays from the whole screen reaches the position of a viewer watching the projection television.

A conventional rear projection screen, by way of example, includes a Fresnel lens sheet as a condensing element and a lenticular lens sheet as a diffusing element, in the direction of travel of light.

Light rays projected from the projection element toward the rear projection screen pass through the Fresnel lens sheet to be made parallel light rays as a whole, and then pass through the lenticular lens sheet.

The lenticular lens sheet has a cylindrical lens formed thereon. The light rays are refracted and diffused when passing through the lenticular lens sheet, and are allowed to have, for example, a directivity in the vertical direction ranging approximately between 10 and 40 degrees at full width at half maximum of light distribution, and a wider directivity in the lateral direction ranging approximately between 30 and 90 degrees at full width at half maximum of light distribution. Such lenticular lens sheet has the function of diffusing light rays in the horizontal direction in which viewers are positioned, so that more people can observe the rear projection screen.

Such rear projection screen is in most cases provided with a Fresnel lens surface on a light exiting side of a Fresnel lens sheet in order to prevent light loss on an unnecessary surface of Fresnel lens teeth.

Such screen is disclosed in Japanese Patent Application Laid-Open No. 2002-196422 (pp. 2–3, FIG. 1), and techniques related to such screen are disclosed in the following Japanese Patent Application Laid-Open Nos: 10-111537 (1998) (pp. 4–5, FIGS. 1 & 3); 2002-311211 (p.5, FIGS. 1–3); 58-163930 (1993) (pp. 3–4, FIG. 2); 2002-174703 (pp. 3–5, FIG. 2); and 9-120102 (1997) (pp. 3–4, FIGS. 1 & 2).

In the above-described rear projection screen, however, a cylindrical lens changes the direction of travel of light rays by refraction, thereby diffusing the light rays. This may cause chromatic aberration due to refractive index wavelength dispersion of a material making up of a lenticular lens sheet, disadvantageously causing an image to take on a different hue when viewed from an angle.

Further, reflected light is inevitably generated, as well as refracted light, at a refracting surface of a lens. Such reflected light disadvantageously causes ghosts and blurred images.

SUMMARY OF THE INVENTION

It is therefore an object of the present invention to provide a technique capable of contributing to improved clarity of images.

According to the present invention, a diffuser panel for a rear projection screen for diffusing light comprises first reflecting elements for condensing incident light to substantially one spot or one line, periodically provided in at least one direction between a light incident surface and a light exiting surface.

Incident light rays are condensed by the first reflecting elements onto substantially one spot or one line, and are thereafter diffused. Since light rays are diffused mainly utilizing reflection, the diffuser panel for a rear projection screen of the present invention can prevent color discrepancy caused by chromatic aberration due to refractive index wavelength dispersion of a material, as well as ghosts and blurred images resulting from reflected light generated with refraction, contributing to improved clarity of images.

These and other objects, features, aspects and advantages of the present invention will become more apparent from the following detailed description of the present invention when taken in conjunction with the accompanying drawings.

DESCRIPTION OF THE PREFERRED EMBODIMENTS

First Preferred Embodiment

Figure 1:
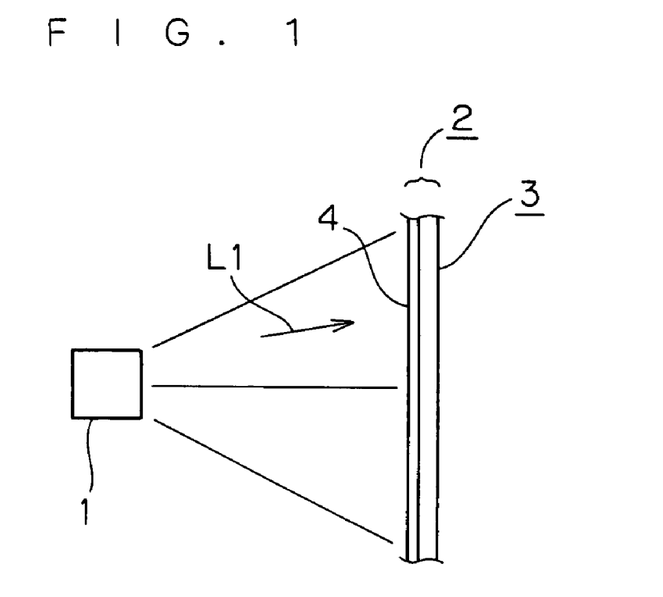
FIG. 1 is a side view of a rear projection screen according to a first preferred embodiment of the present invention.

FIG. 1 is a side view of a rear projection screen 2 according to a first preferred embodiment of the present invention and a use mode thereof.

The rear projection screen 2 includes a diffusion sheet 3 as a diffuser panel and a Fresnel lens sheet 4. A projection device 1 is provided on one main surface or rear side of the rear projection screen 2.

Upon receipt of an image signal, the projection device 1 converts such image signal to light two-dimensionally modulated in intensity per pixel using a light bulb (not shown) and the like, to generate an image, and emits projected light rays L1 corresponding to the generated image toward the rear projection screen 2.

In the rear projection screen 2, as schematically shown, the projected light rays L1 projected under magnification onto the Fresnel lens sheet 4 enter the Fresnel lens sheet 4, and are converted to substantially parallel light rays, to be emitted to the diffusion sheet 3. The diffusion sheet 3 emits the substantially parallel light rays upon widening their directivities both in the vertical and laterial directions.

Figure 2:
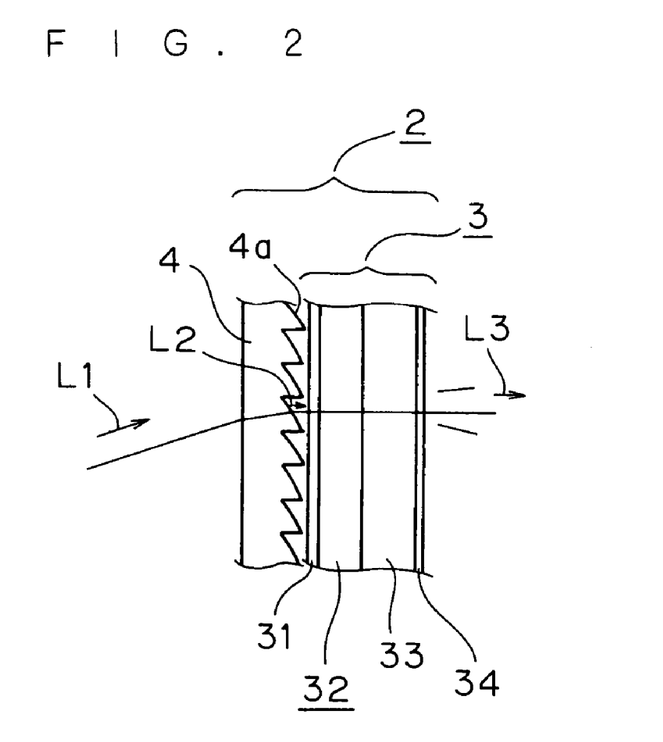
FIG. 2 is a partially enlarged view of the rear projection screen according to the first preferred embodiment.

FIG. 2 is a partially enlarge view of the rear projection screen 2 in FIG. 1. As shown in FIG. 2, the screen 2 is composed of the Fresnel lens sheet 4 and diffusion sheet 3 overlapping each other.

The Fresnel lens sheet 4 has one main surface serving as a light incident surface (on the left side in FIG. 2) and the other main surface serving as a light exiting surface (on the right side in FIG. 2). The light exiting surface has irregularities of predetermined shape constituting lenses, which is a Fresnel lens surface 4a. The project light rays L1 enter at the light incident surface and pass though the Fresnel lens sheet 4 to exit from the Fresnel lens surface 4a, and are converted to light rays L2 substantially parallel to the direction of the normal to the screen 2.

The diffusion sheet 3 is a member provided on the side of the Fresnel lens surface 4a of the Fresnel lens sheet 4, having one main surface serving as a light incident surface (on the left side in FIG. 2) and the other surface serving as a light exiting surface (on the right side in FIG. 2). Further, the diffusion sheet 3 has a transparent sheet 31, a diffused reflection base material 32, an ND (neutral density) colored plate 33 and a reflection reducing member 34, in this order in the direction of travel of the light rays L1 to L3.

The behavior of light in the diffusion sheet 3 will be summarized now. First, the transparent sheet 31 allows the light ray L2 received at its light incident surface to pass therethrough. Next, the diffused reflection base material 32 causes light to have a wider directivity. For instance, the base material 32 allows the light ray L3 to have a directivity of approximately 30 degrees at half width at half maximum of light distribution in the horizontal direction and approximately 10 degrees at half width at half maximum of light distribution in the vertical direction. The light ray L3 is then emitted to the ND colored plate 33. The light ray L3, passing through the ND colored plate 33 and reflection reducing member 34, exits from the light exiting surface of the diffusion sheet 3. The horizontal and vertical directions are defined here as those in a projector provided with the rear projection screen 2 in a normal use mode.

The ND colored plate 33 is so colored as to have a light transmittance of approximately 80% and a flat wavelength dependence. The reflection reducing member 34 is for reducing reflected light resulting from extraneous light, and is composed of a single-or multi-layer optical thin film (not shown) provided on the light exiting surface of the ND colored plate 33 (on the right side in FIG. 2). As such reflection reducing member 34, various well-known structures, for example, for diffusing light by fine surface irregularities can be adopted. These ND colored plate 33 and reflection reducing member 34 have the function of allowing the light ray L3 to pass therethrough as well as preventing extraneous light to be reflected on the Fresnel lens sheet 4, transparent sheet 31, diffused reflection base material 32 and ND colored plate 33 to be a visible interference light ray.

Figure 3:
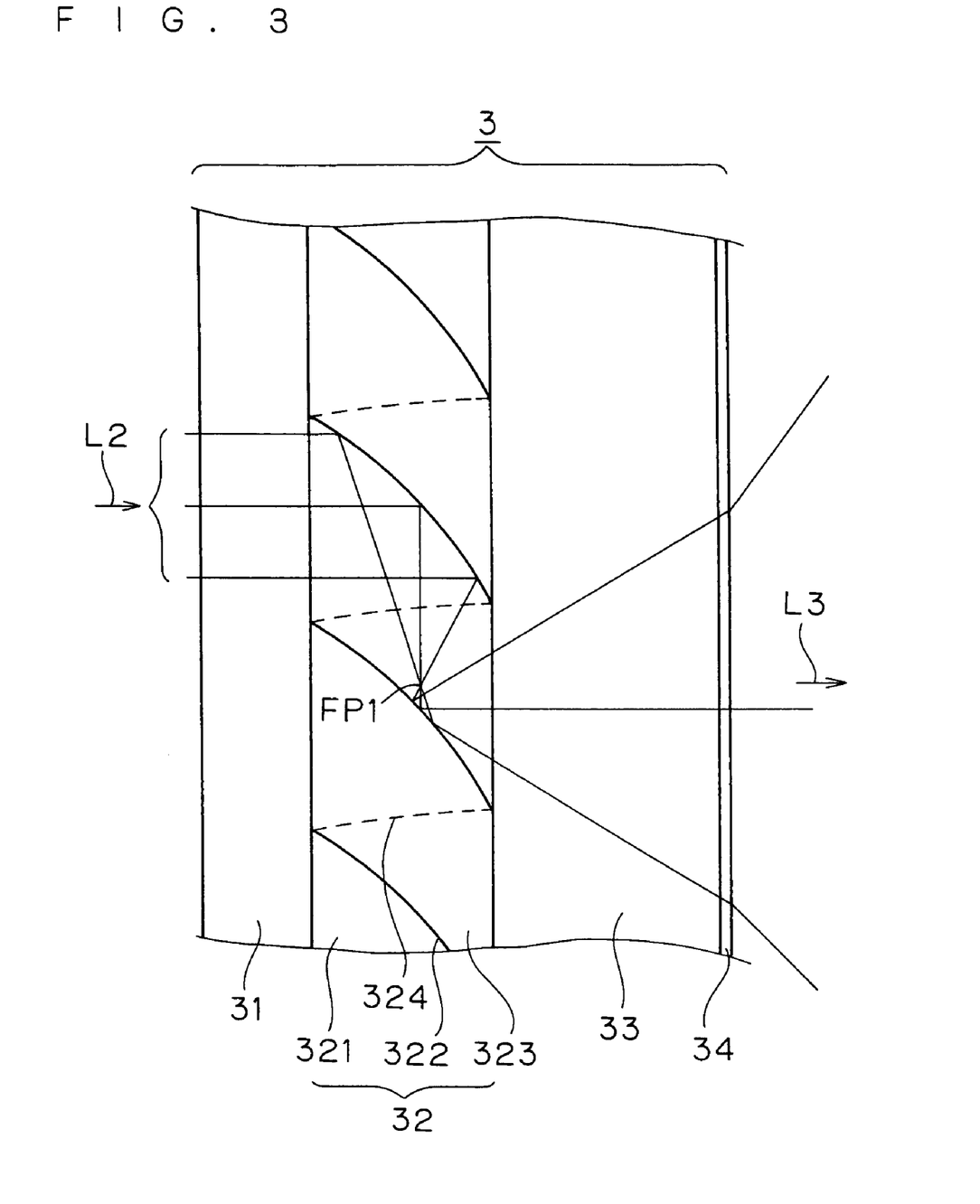
FIG. 3 is a partially enlarged view of a diffusion sheet viewed from above.

FIG. 3 is a partial sectional view of the diffusion sheet 3 viewed from above. The diffused reflection base material 32 has a first transparent medium 321, reflecting mirrors 322 and a second transparent medium 323.

The first transparent medium 321 is a transparent member formed by UV molding or the like.

The reflecting mirrors 322 are reflecting devices formed by aluminum deposition, sputtering or the like. An inside concave mirror part of each of the reflecting mirrors 322 serves as a first reflecting device for condensing the incident light ray L2 on a focal point FP1. An outside convex mirror part of each of the reflecting mirrors 322 serves as a second reflecting device for bending the principal axis of light reflected from the concave mirror part in the direction of the normal to the light exiting surface.

As described, each of the reflecting mirrors 322 of single type achieves both the functions of the first and second reflecting devices. This enables a simpler structure than in the case where those functions are achieved by separate members.

The second transparent medium 323 is a transparent member for covering and thus protecting the convex mirror part on the outer surface (rear side) of each of the reflecting mirrors 322, and has light diffusivity.

An interface 324 of the first transparent medium 321 and second transparent medium 323 is present between each of the reflecting mirrors 322.

It should be noted that those components periodically provided such as the reflecting mirrors 322 and interfaces 324 are all indicated by the same reference numerals, respectively, without individual identification. This also applies to preferred embodiments to be described later.

The light ray L2 enters the diffused reflection base material 32 at the first transparent medium 321 and exits from the second transparent medium 323.

More specifically, the light ray L2 shown in the side view of FIG. 2 is illustrated in the partially enlarged view of FIG. 3 as containing a plurality of light rays passing through different positions. These light rays L2 enter the transparent sheet 31, pass therethrough linearly, and enter the first transparent medium 321. The first transparent medium 321 guides the light rays L2 to the reflecting mirrors 322.

The reflecting mirrors 322 each extend long in the vertical direction of the screen and have a parabolic shape in cross section in the direction perpendicular to their longitudinal direction. In other words, the reflecting mirrors 322 each have a shape of parabolic cylinder as a kind of quadric surface having a linear focal point. Accordingly, the inside concave mirror part of each of the reflecting mirrors 322 condenses light on substantially one spot or one line, and then diffuses the condensed light. All of the reflecting mirrors 322 may not necessarily have a quadric surface shape, but at least part of the reflecting mirrors 322 may be formed in a quadric surface shape having a focal point (including the cases where light is condensed on substantially one spot or one line). FIG. 3 shows the mode in which the focal point FP1 created by the concave mirror part of one of the reflecting mirrors 322 is positioned between the one of the reflecting mirrors 322 and an adjacent one of the reflecting mirrors 322.

The reflecting mirrors 322 are periodically provided at a predetermined interval in the horizontal direction of the screen.

To achieve uniform and wide diffusion characteristics and to obtain clear images, the periodic interval is preferably smaller than the pixel size in the horizontal direction of the screen. The pixel size in the horizontal direction on the screen 2 differs depending on the screen size and the number of pixels on a display screen, but generally ranges approximately from 0.5 to 1.0 mm. Therefore, the periodic interval is preferably set at approximately 0.1 mm.

The concave mirror part of one of the reflecting mirrors 322 reflects the incident light rays L2 to be condensed on the focal point FP1. In this case, the light rays L2 are condensed in the horizontal direction to have a directivity ranging approximately from 15 to 20 degrees, for example, at half width at half maximum with respect to the optical axis of the concave mirror part of the reflecting mirror 322, and are then diffused. That is, the light rays L2 are each allowed to have a directivity in the horizontal direction at angles within a predetermined range.

The light rays L2 reflected from the concave mirror part of one of the reflecting mirrors 322 travel from the first transparent medium 321 to the second transparent medium 323 passing through the interface 324, and pass through the focal point FP1, to be reflected on the outside convex mirror part of an adjacent one of the reflecting mirrors 322 (on its rear side). Accordingly, the direction of travel of the light rays L2 is bent toward the light exiting surface.

When the light rays L2 pass through the second transparent medium 323, the medium 323 diffuses the light rays L2 by a diffusion material so that the light rays L2 each have an isotropic directivity of approximately 10 degrees at half width at half maximum of intensity.

The light rays each provided with a directivity as above described pass through the ND colored plate 33 and reflection reducing member 34, and as a result, exit from the light exiting surface as the light ray L3 which has been passed through the diffusion sheet 3.

The shape of the reflecting mirrors 322 are not limited as described above, but is determined such that a horizontal directivity obtained by combining a horizontal directivity given by the reflecting mirrors 322 and a directivity given by the diffusion material contained in the second transparent medium 323 is a required directivity in the horizontal direction.

For instance, the focal point FP1 is not required to be in the aforementioned position, but may be located in the vicinity of an adjacent one of the reflecting mirrors 322. For instance, in the case where the focal point FP1 is located in front of an adjacent one of the reflecting mirrors 322 as shown in FIG. 3, the convex mirror part of the adjacent one of the reflecting mirrors 322 is allowed to have a wider optical directivity. In the case where the focal point FP1 is located on the rear face (the convex mirror part) of the adjacent one of the reflecting mirrors 322, the convex mirror part of the adjacent one of the reflecting mirrors 322 merely functions as a reflecting mirror for bending the direction of travel of light. In the case where the focal point FP1 is located beyond the adjacent one of the reflecting mirrors 322, the convex mirror part of the adjacent one of the reflecting mirrors 322 functions such that the optical directivity gets narrower to some extent.

In either cases, the parallel light rays L2 entering the diffused reflection base material 32 can be diffused, and the focal point FP1 is located such that a required directivity can be obtained.

Further, the size of the reflecting mirrors 322, the periodic interval between the reflecting mirrors 322, an angle at half maximum of a target light distribution, and the like are not limited to the above-described numerical values, but may be close to the above-described values. Although being arranged in close contact with each other, the reflecting mirrors 322 may be arranged at a predetermined interval.

Figure 4:
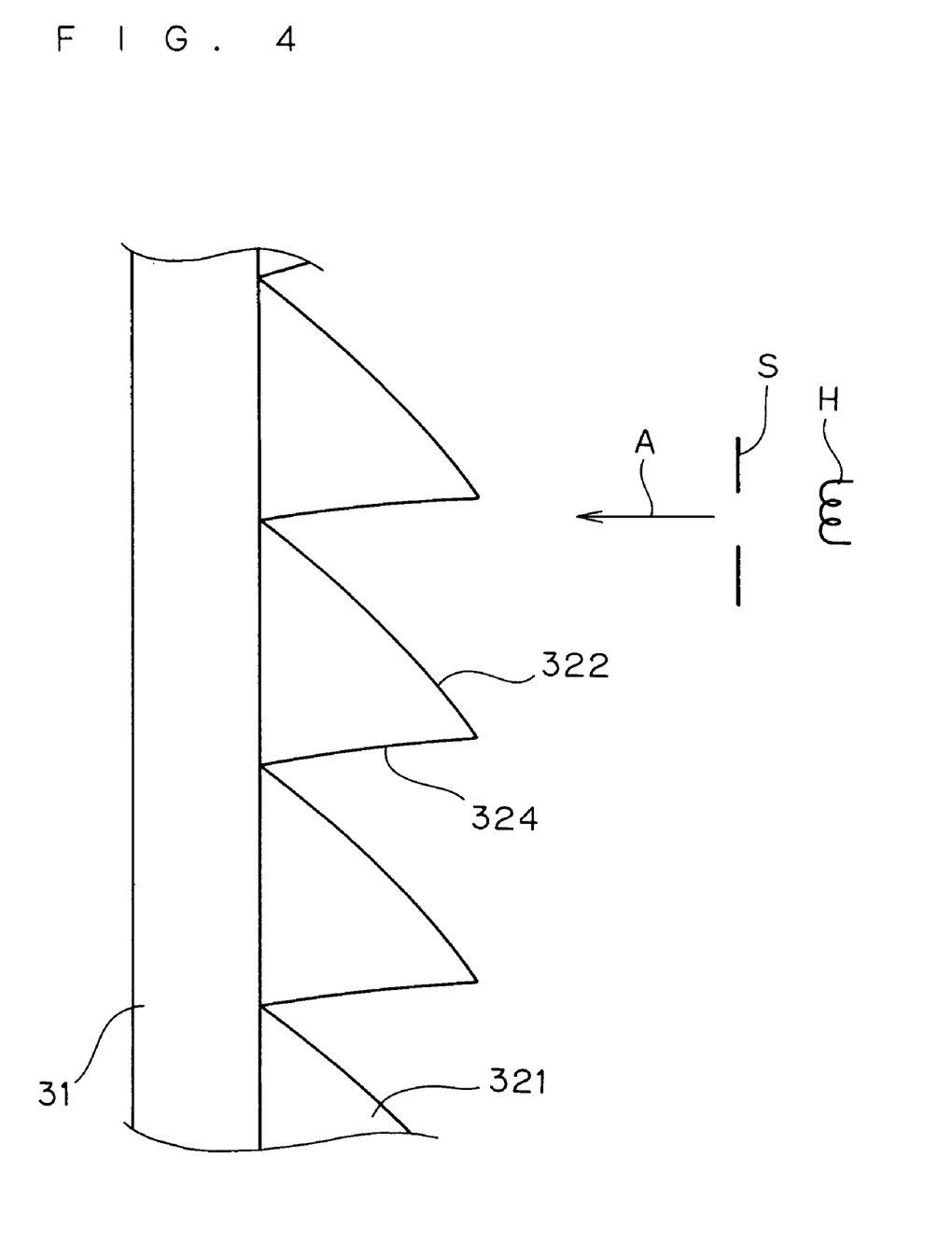
FIGS. 4 and 5 are explanatory views of a method of manufacturing a diffusion-reflection base material.
Figure 5:
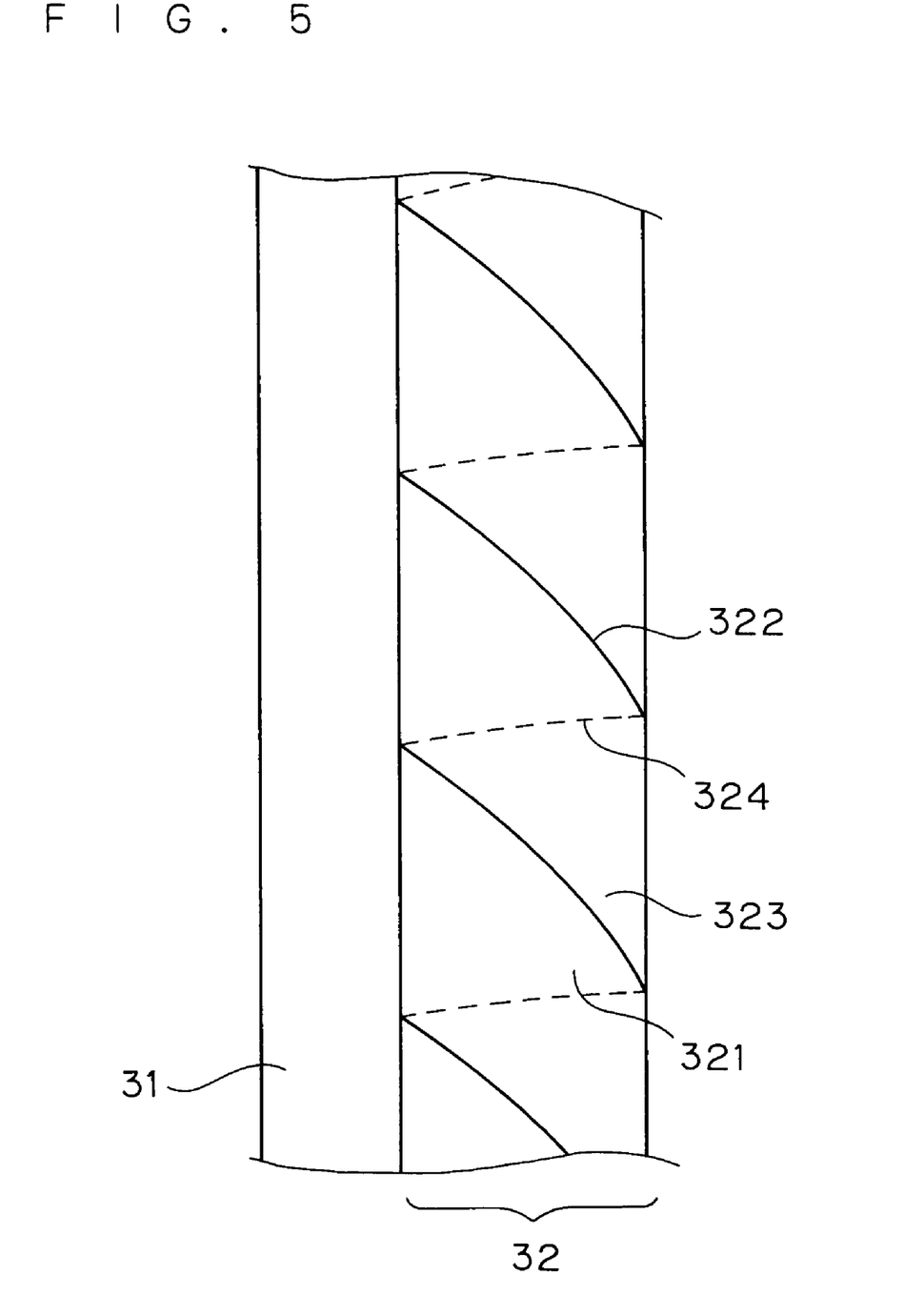

FIGS. 4 and 5 are partially enlarged views of a method of manufacturing the diffused reflection base material 32 specific to the present invention.

FIG. 4 shows a metal heating portion H of a deposition or sputtering device, a slit member S and a direction A of travel of aluminum.

For manufacture of the diffused reflection base material 32, the transparent sheet 31 is prepared with the first transparent medium 321 formed on its one side surface. The first transparent medium 321 is formed of, for example, UV molded resin, with its outer surface having periodic irregularities corresponding to the shape of the reflecting mirrors 322 by roll process molding using a roll die (not shown) or the like.

Then, aluminum traveling from the heating section H through a slit of the slit member S along an arrow A is selectively deposited or subjected to sputtering on a curved surfaces of the surface irregularities of the first transparent medium 321 for forming the reflecting mirrors 322. At this time, aluminum is deposited or subjected to sputtering so as to have a thickness of 50 nm or greater. The reflecting mirrors 322 are thereby formed. Care should be taken to prevent aluminum from adhering onto the interface 324.

As described, forming a metal film on the irregular surface of the first transparent medium 321 allows the reflecting mirrors 322 to be easily formed.

Next, as shown in FIG. 5, UV resin containing a diffusion material is poured onto the rear side of the reflecting mirrors 322 to cover all the reflecting mirrors 322 such that a flat surface can be obtained, and is subjected to UV irradiation so as to be solidified. The second transparent medium 323 is thereby formed.

In this state, the reflecting mirrors 322 are included in the first transparent medium 321 and second transparent medium 323. Accordingly, the diffused reflection base material 32 has its both surfaces finished flat, which effectively prevents damage to the reflecting mirrors 322.

In such manufacturing steps, the use of a long member that can be rolled up as the transparent sheet 31 allows continuous manufacture of a series of diffused reflection base materials 32. This contributes as a whole to low cost manufacture of the rear projection screen 2.

For instance, in the case where the periodic interval between the reflecting mirrors 322 is 0.1 mm, the diffused reflection base material 32 has a thickness of the same degree. When the transparent sheet 31 is made of a soft material that can be rolled up, the diffused reflection base material 32 is thin, and they have low rigidity even in combination. Therefore, the screen 2 is difficult to maintain flatness.

Therefore, a flat member is preferably adhered integrally with at least one of the light incident surface or light exiting surface of the diffused reflection base material 32, so that flatness can be maintained.

In the present preferred embodiment, the ND colored plate 33 and the reflection reducing member 34 formed on its one side surface (or both side surfaces) are optically and mechanically adhered integrally by a transparent agent (not shown) or the like, so that the diffusion sheet 3 maintains flatness as a whole. That is, the ND colored plate 33 functions as a flat member for maintaining flatness.

With the rear projection screen 2 and diffusion sheet 3 constructed as described above, the incident light rays L2 are condensed by the concave mirror parts of the reflecting mirrors 322, and are thereafter diffused. In this way, light rays can be diffused mainly utilizing reflection. This can prevent color discrepancy caused by chromatic aberration due to refractive index wavelength dispersion of a material, as well as ghosts and blurred images resulting from reflected light generated with refraction, which contributes to improved clarity of images.

Further, the diffusion sheet 3 has its light incident surface and light exiting surface finished flat, and is therefore difficult to be broken.

Particularly since the light incident surface of the diffusion sheet 3 to be opposed to the Fresnel lens surface 4a of the Fresnel lens sheet 4 is finished flat, it is possible to prevent the occurrence of dust and deformation of a surface through which light rays pass caused by rubbing of the flat light incident surface and Fresnel lens surface 4a against each other. This also contributes to improved clarity of images.

Further, the second transparent medium 323 contains a diffusion material, and can therefore diffuse light rays isotropically, including not only the horizontal direction but also the vertical direction.

Furthermore, the reflection reducing member 34 reduces reflection of extraneous light, achieving improved contrast.

Still further, the ND colored plate 33 can adjust the quantity of light.

Second Preferred Embodiment

Figure 6:
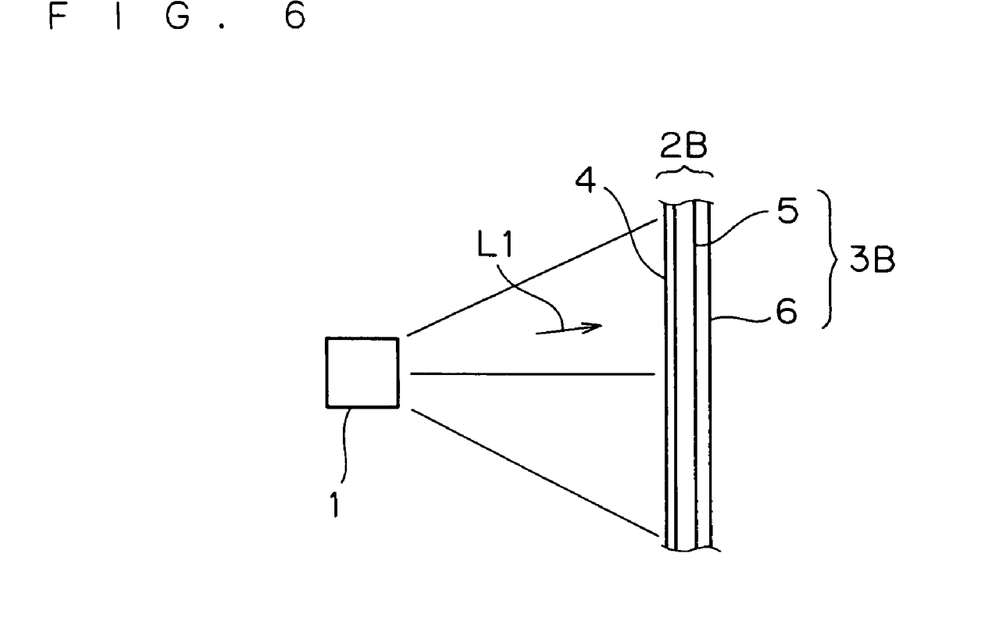
FIG. 6 is a side view of a rear projection screen according to a second preferred embodiment of the present invention.

FIG. 6 is a side view of a rear projection screen 2B according to a second preferred embodiment of the present invention and a use mode thereof.

The rear projection screen 2B includes a diffusion structure 3B instead of the diffusion sheet 3 according to the first preferred embodiment. Other components similar to those described in the first preferred embodiment are indicated by the same reference characters, explanation of which is omitted here.

Figure 7:
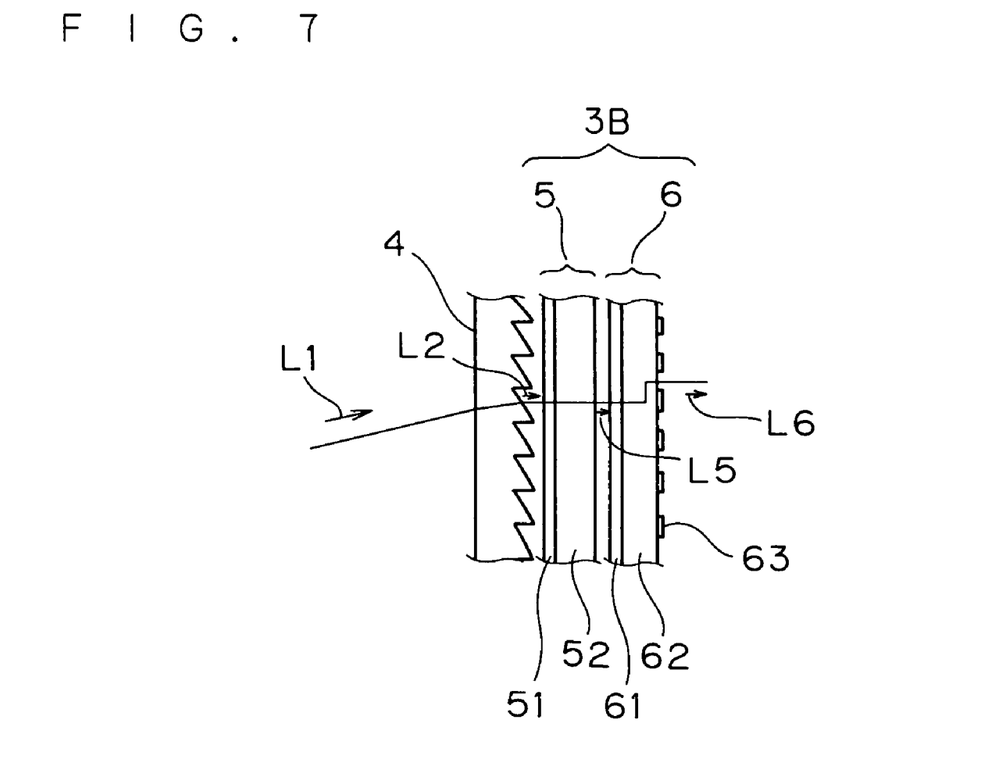
FIG. 7 is a partially enlarged view of the rear projection screen according to the second preferred embodiment.

FIG. 7 is a partially enlarged view of the rear projection screen 2B in FIG. 6. As shown in FIGS. 6 and 7, the screen 2B is composed of the Fresnel lens sheet 4, a first diffuser panel 5 and a second diffuser panel 6, in this order in the direction of travel of light rays. The Fresnel lens sheet 4, first diffuser panel 5 and second diffuser panel 6 are held by a screen frame (not shown) and the like to be in close contact with each other. The first diffuser panel 5 and second diffuser panel 6 form the diffusion structure 3B in combination.

The projected light rays L1 pass through the Fresnel lens sheet 4, to be the generally parallel light rays L2. This light rays L2 enter the first diffuser panel 5, are each allowed to have a directivity approximately 30 degrees at half width at half maximum of light distribution, and are emitted as light rays L5. The light rays L5 enter the second diffuser panel 6, are each allowed to have a directivity of approximately 10 degrees at half width at half maximum of light distribution, and are emitted as light rays L6.

The first diffuser panel 5 is composed of a transparent sheet 51 and a diffused reflection base material 52. The transparent sheet 51 and diffused reflection base material 52 respectively have similar structures as the transparent sheet 31 and diffused reflection base material 32 described in the first preferred embodiment.

However, a second transparent medium in the diffused reflection base material 52 (corresponding to the second transparent medium 322) does not contain a diffusion material or contains a relatively small amount of diffusion material. That is, a diffusion material can diffuse light isotropically, and therefore, diffuses and reflects extraneous light as well. As a result, black portions of images may be seen in white, which may be a factor that lowers the contrast. Therefore, by providing a small amount of diffusion material or no diffusion material, higher contrast under extraneous light is achieved. Then, with a small amount of diffusion material or no diffusion material, vertical diffusion of light rays is performed by the second diffuser panel 6. It should be noted that the light rays L5 passed through the first diffuser panel 5 are diffused in the horizontal direction, but are less diffused in the vertical direction, which are nearly parallel light rays.

Figure 8:
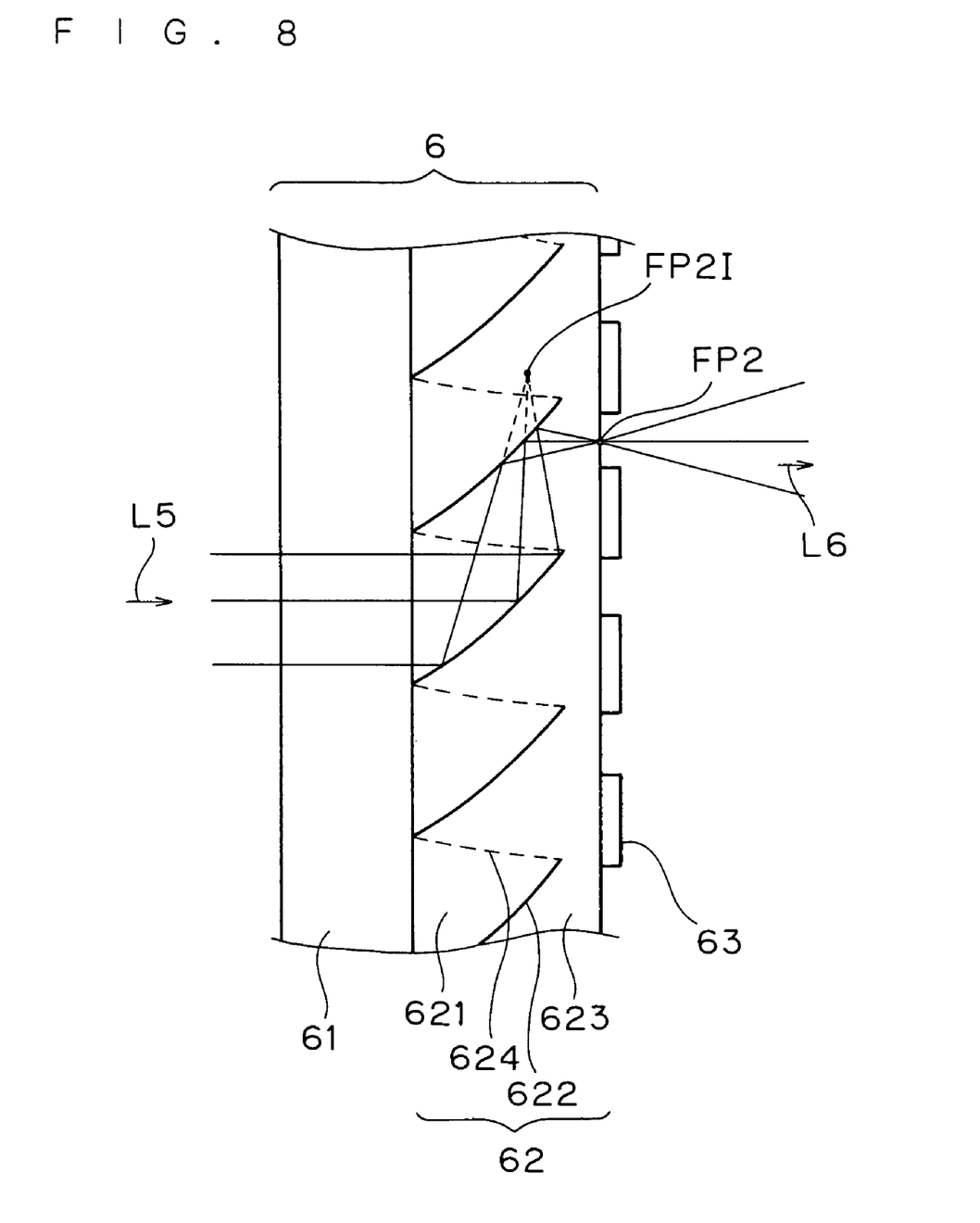
FIG. 8 is a partially enlarged view of a second diffuser panel viewed from side.

FIG. 8 is a partially enlarged view of a side face of the second diffuser panel 6, and shows the path of travel of projected light rays. The second diffuser panel 6 includes a transparent sheet 61 of a similar structure as the aforementioned transparent sheet 31 and a diffused reflection base material 62.

The diffused reflection base material 62 is composed of a first transparent medium 621, reflecting mirrors 622 and a second transparent medium 623.

The first transparent medium 621, reflecting mirrors 622 and second transparent medium 623 respectively have similar structures as the first transparent medium 321, reflecting mirrors 323 and second transparent medium 323 described in the first preferred embodiment. An interface 624 is present between the first transparent medium 621 and second transparent medium 623. The second transparent medium 623 may contain a diffusion material or may be subjected to ND coloring, depending on a required optical directivity, a required contrast, and the like.

The first diffuser panel 5 and second diffuser panel 6 overlap each other such that the respective reflecting mirrors 322 and 622 extend in different directions, in other words, such that the reflecting mirrors 322 and 622 have different optical axes of reflected light from the concave mirror part, resulting in different directivities in diffusion. More specifically, the first diffuser panel 5 and second diffuser panel 6 overlap each other such that the reflecting mirrors 322 of the first diffuser panel 5 are arranged to extend in the vertical direction so as to perform horizontal diffusion, while the reflecting mirrors 622 of the second diffuser panel 6 are arranged to extend in the horizontal direction so as to perform vertical diffusion.

Further, black stripes 63 extending in the extending direction of the reflecting mirrors 622 are periodically formed at a predetermined interval on the light exiting surface of the second transparent medium 623 in the direction that the reflecting mirrors 622 are periodically provided. The black stripes 63 are black light absorbing members, and absorb disturbance light, achieving higher contrast.

Indicating a focal point of reflected light from the concave mirror part of one of the reflecting mirrors 622 with FP2I, and a substantial parabolic focal point of reflected light from the convex mirror part on the outer surface (rear face) of an adjacent one of the reflecting mirrors 622 with FP2, the focal point FP2 is set to be arranged at a space between adjacent ones of the black stripes 63. Accordingly, light rays reflected from the concave mirror part of one of the reflecting mirrors 622 and then reflected from the convex mirror part of an adjacent one of the reflecting mirrors 622 are not absorbed at the black stripes 63.

The path of travel of light rays in the second diffuser panel 6 will be described. As described, since the light rays L5 passed through the first diffuser panel 5 are nearly parallel light rays as viewed in the vertical direction, the light rays L5 are also considered as entering in the side view of FIG. 8. In this case, the light rays L5 pass through the transparent sheet 61 and first transparent medium 621, and are reflected from one of the reflecting mirrors 622, so that the direction of travel is changed toward an adjacent one of the reflecting mirrors 622 (upwardly in FIG. 8). The light rays L5 reflected from the concave mirror part of one of the reflecting mirrors 622 travel as convergent bundle, passing through the interface 624 and then the second transparent medium 623, and are reflected from the convex mirror part of an adjacent one of the reflecting mirrors 622, so that the direction of travel is changed toward the light exiting surface (to the right side in FIG. 8). Then, the light rays pass through the focal point FP2 at a position where they should exit from the second transparent medium 623, and travel through the space between adjacent ones of the black stripes 63, to be emitted as light rays L6 which have passed through the second diffuser panel 6.

At this time, the focal point FP2 of light reflected from the reflecting mirrors 622 is set to be arranged in the space between adjacent ones of the black stripes 63. More preferably, the reflecting mirrors 622 are formed in as correct paraboloid as possible, so that light rays are preferably condensed at the focal point FP2 in a small spot having no chromatic aberration. This can reduce the space between adjacent ones of the black stripes 63, in other words, the occupation area ratio of the black stripes 63 on the screen 2B can be increased, which achieves improved contrast.

The black stripes 63 are required to be provided in relatively correct positions with respect to the reflecting mirrors 622, without obstructing the focal point FP2. Well-known techniques disclosed in aforementioned Japanese Patent Application Laid-Open Nos. 2002-311211 and 9-120102 (1997) may be applied to a method of forming the black stripes 63 on the surface of the second transparent medium 623.

In addition to the advantages achieved by the first preferred embodiment, the rear projection screen 2B constructed as described above achieves an advantage in that diffusion can be performed using reflection independently in the horizontal and vertical directions, achieving more improved clarity of images.

Another advantage is in that improved contrast can be obtained as described below.

That is, the black stripes 63 as described above are basically provided on the light exiting surface to absorb extraneous light, for achieving improved contrast, as disclosed in the above two documents. In this respect, the present invention is similar to the two documents.

In the above two documents, however, extraneous light enters from the space between the black stripes 63, and is reflected by the diffusion material inside. Therefore, degradation in contrast due to extraneous light cannot be effectively prevented.

In contrast, with the diffusion structure 3B according to the present embodiment, diffusion is performed in the horizontal and vertical directions using reflection in the first diffuser panel 5 and second diffuser panel 6, diffusion materials in the first diffuser panel 5 and second diffuser panel 6 can be reduced or eliminated. Diffusion materials generally cause reflection of extraneous light to bring lowered contrast. Since such diffusion materials can be reduced or eliminated in the present preferred embodiment, contrast can be improved. The black stripes 63 may be applied to the rear projection screen 2 according to the first preferred embodiment.

Particularly since the black stripes 63 are provided on the light exiting surface of the diffusion structure 3B, loss of the light rays L2 entered the diffusion structure 3B at the whole light incident surface with substantially equal quality can effectively be prevented.

Further, there is another advantage in achieving improvement and adjustment in front brightness.

That is, in order to reflect, where possible, all projected light rays reflected from the concave mirror part of the reflecting mirrors 622 to effectively use the projected light rays, the interface 624 is preferably formed in the direction of the normal to the transparent sheet 61. Actually, however, the interface 624 is formed with a slight inclination due to factors in manufacturing technique and the like. Such inclination appears as spaces between the reflecting mirrors 622 when the screen 2B is viewed from its front. Therefore, the light rays L5 travel linearly through the spaces between the reflecting mirrors 622, and reach the black stripes 63 to be absorbed there.

Here, with the assumption that the black stripes 63 are not provided, the light rays L5 travel linearly, and exit as the light rays L6.

Therefore, when the front brightness of the screen 2B is requested to be as high as possible, part of the black stripes 63 which the linearly traveling light rays reach (that is, projected areas of the interface 624 on the light exiting surface) may be partially or completely removed.

Further, when the front brightness is requested to be higher, the inclination of the interface 624 may be increased employing the above-described construction, so that the amount of light that travels linearly increases.

Third Preferred Embodiment

Figure 9:
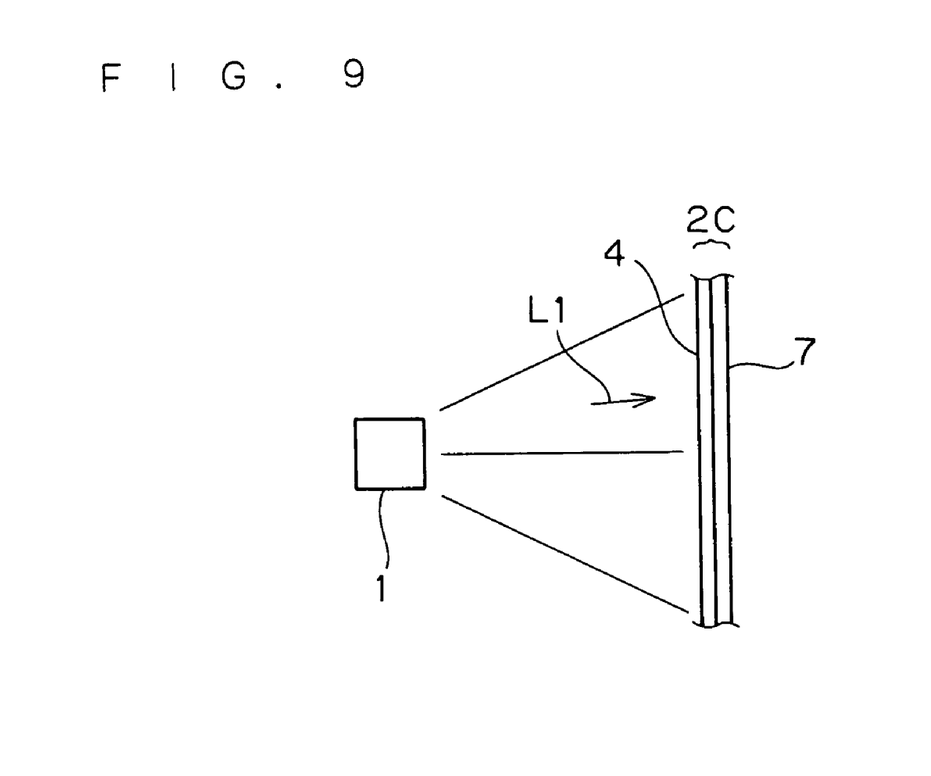
FIG. 9 is a side view of a rear projection screen according to a third preferred embodiment of the present invention.

FIG. 9 is a side view of a rear projection screen 2C according to a third preferred embodiment of the present invention and a use mode thereof.

This rear projection screen 2C includes a diffusion sheet 7 instead of the diffusion sheet 3 according to the first preferred embodiment. Other components similar to those described in the first preferred embodiment are indicated by the same reference characters, explanation of which is omitted here.

Figure 10:
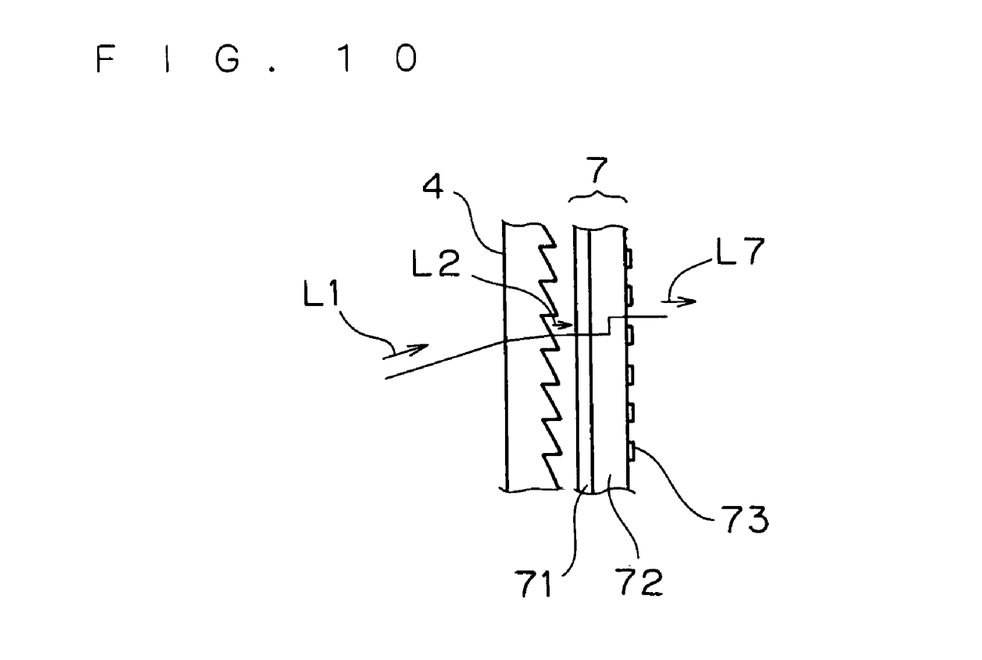
FIG. 10 is a partially enlarged view of the rear projection screen according to the third preferred embodiment.

FIG. 10 is a partially enlarged view of the rear projection screen 2C. The diffusion sheet 7 is composed of a transparent sheet 71, a diffused reflection base material 72 and black stripes 73, in this order in the direction of travel of light rays. The projected light rays L1 pass through the Fresnel lens sheet 4, and are made nearly parallel light rays L2, traveling toward the diffusion sheet 7. The light rays L2, entering the first diffusion sheet 7 at the light incident surface, pass through the transparent sheet 71 and diffused reflection base material 72, and then the spaces between the black stripes 73, and are emitted as light rays L7. When passing through the diffused reflection base material 72, the light rays L2 are diffused such that the path of travel is widened in the horizontal and vertical directions.

Figure 11:
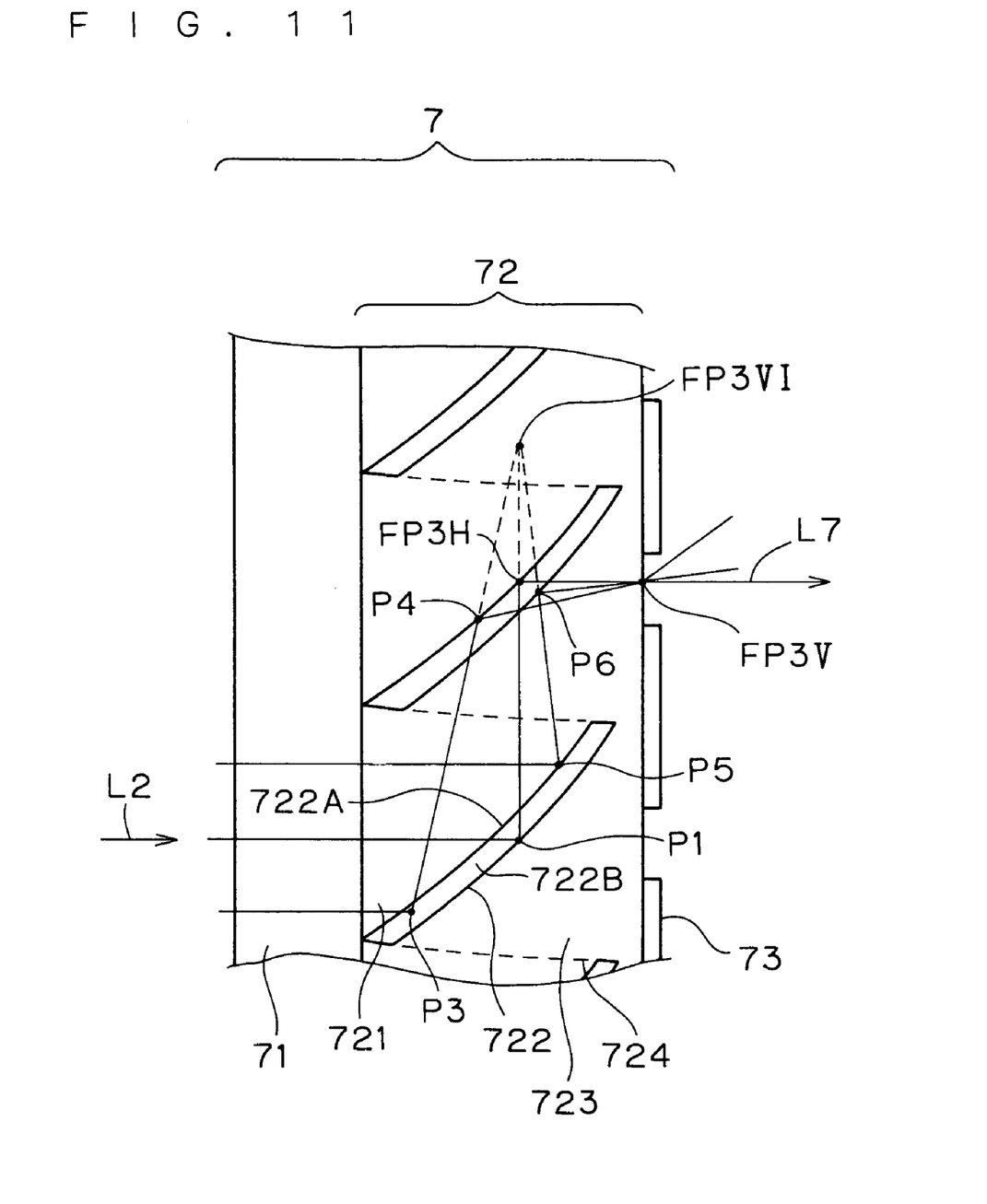
FIG. 11 is a partially enlarged side view of a diffusion sheet.
Figure 12:
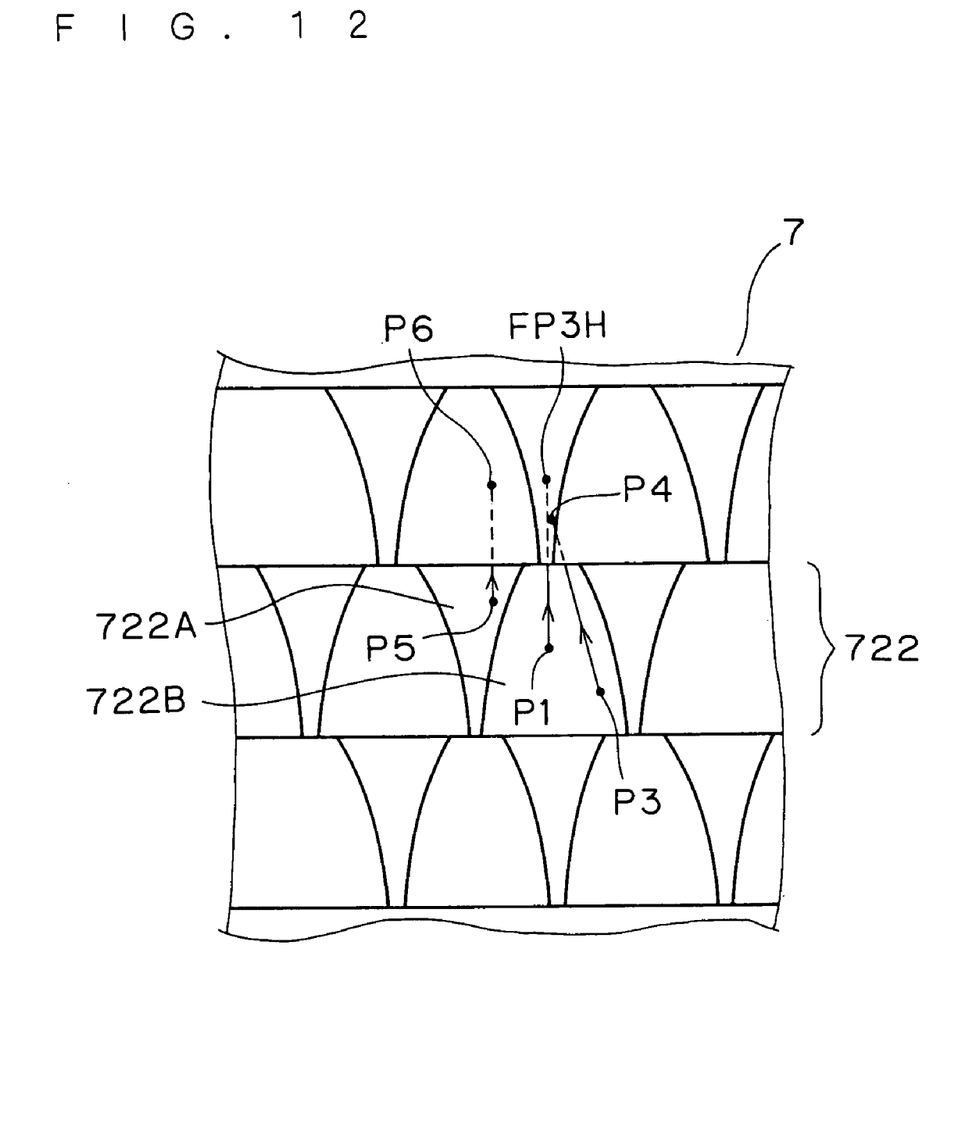
FIG. 12 shows the diffusion sheet viewed from a light-entering side.

FIG. 11 is a partially enlarged view of the diffusion sheet 7, and FIG. 12 shows the diffusion sheet 7 as viewed from the light incident surface. For ease of description, the black stripes 73 are not illustrated in FIG. 12.

The diffused reflection base material 72 includes a first transparent medium 721, reflecting mirrors 722 and a second transparent medium 723. An interface 724 of the first transparent medium 721 and second transparent medium 723 is present between each of the reflecting mirrors 722.

The reflecting mirrors 722 each schematically have a cylindrical shape extending in the lateral direction of the screen, and are periodically provided in the vertical direction of the screen at an interval smaller than a pixel size. The pixel size in the vertical direction on the screen 2C differs from the screen size and the number of pixels of a display image. A general pixel size in the vertical direction on the screen 2C ranges approximately from 0.5 to 1.0 mm, and the reflecting mirrors 722 are periodically provided in the vertical direction of the screen at an interval of approximately 0.1 mm, for example.

The concave mirror part of each of the reflecting mirrors 722 is configured such that the light rays L2 are condensed at horizontal focal point FP3H and vertical focal point FP3V.

More specifically, the reflecting mirrors 722 each have a parabolic cylinder mirror portion 722A with its horizontal axis extending in the lateral direction of the light incident surface, for example, and a paraboloidal mirror portion 722B with its rotation axis extending in the direction of the normal to the light incident surface (see FIG. 12). These portions 722A and 722B are periodically provided alternately along the length of the reflecting mirrors 722. The periodic interval is preferably smaller than the pixel size in the horizontal direction in which the portions 722A and 722B are arranged. The parabolic cylinder mirror portion 722A and paraboloidal mirror portion 722B of one of the reflecting mirrors 722 are shifted by half cycle with respect to those of an adjacent one of the reflecting mirrors 722, and the parabolic cylinder mirror portion 722A of one of the reflecting mirrors 722 and the paraboloidal mirror portion 722B of the adjacent one of the reflecting mirrors 722 are opposed to each other.

The parabolic cylinder mirror portion 722A is an element for condensing and diffusing light in the vertical direction. A focal point FP3VI of the parabolic cylinder mirror portion 722A of one of the reflecting mirrors 722 is set to be provided as the substantial focal point FP3V between adjacent ones of the black stripes 73 by reflection from the convex mirror part on the outer surface (rear side) of an adjacent one of the reflecting mirrors 722 (more specifically, the paraboloidal mirror portion 722B).

That is, the parabolic cylinder mirror portion 722A has the function of diffusing the light rays L2 in the vertical direction on the same principle and by the same action as the reflecting mirrors 322 and 622 described in the above-described first and second preferred embodiments, respectively.

The paraboloidal mirror portion 722B is an element for condensing and diffusing light in the horizontal and vertical directions, and is obtained by causing a reflecting mirror 722 to have surface irregularities such that a simple parabolic cylinder partly becomes a predetermined paraboloid of revolution. The paraboloidal mirror portion 722B is a paraboloid of revolution formed by rotation on a line passing through the horizontal focal point FP3H and vertical focal point FP3V.

The paraboloidal mirror portion 722B has the function of diffusing the light rays L2 in the horizontal and vertical directions.

The path of travel of light entering the paraboloidal mirror portion 722B will be described.

In the case where a light ray L2 is reflected at the right angle from a point P1 at substantially the center of the paraboloidal mirror portion 722B of one of the reflecting mirrors 722, for example, the light ray L2 travels to the focal point FP3H, and is reflected from the convex mirror part on the outer surface of an adjacent one of the reflecting mirrors 722 (more specifically, parabolic cylinder mirror portion 722A) so that the direction of travel is changed at substantially the right angle. The light ray L2 then travels to the focal point FP3V, passing through the space between adjacent ones of the black stripes 73, and is emitted as a light ray L7.

On a predetermined plane perpendicular to the screen, light rays entering the diffused reflection base material 72 from different positions in the vertical direction of the screen (vertical direction in FIG. 11) with respect to the light ray L2 reaching the point P1 are respectively reflected from the parabolic cylinder mirror portion 722A of one of the reflecting mirrors 722 at point P5 and the paraboloidal mirror portion 722B at point P3, and then respectively reflected again at points P6 and P4 on the concave mirror part of an adjacent one of the reflecting mirrors 722. The light rays travel so as to pass substantially through the focal point FP3V, and are diffused after passing through the focal point FP3V. Accordingly, the light rays L2 are diffused in the vertical direction.

On the other hand, on a predetermined horizontal plane with respect to the screen, light rays traveling from different positions in the horizontal direction of the screen (toward this or the other side in FIG. 11) relative to the light ray L2 reaching the point P1 are reflected from the paraboloidal mirror portion 722B of one of the reflecting mirrors 722, and then condensed in the vicinity of the focal point FP3H to one spot with respect to components in the horizontal direction while being reflected from an adjacent one of the reflecting mirrors 722 (more specifically, the parabolic cylinder mirror portion 722A) substantially at the right angle, and travel to the focal point FP3V while being diffused in the horizontal direction. Accordingly, the light rays L2 are diffused in the horizontal direction.

From another point of view, the light rays L2 are considered to be projected with substantially uniform distributions onto the light incident surface of the diffused reflection base material 72, averaging various patterns of images.

Those of the light rays L2 that reach the parabolic cylinder mirror portion 722A of one of the reflecting mirrors 722 are reflected from the inner surface thereof (e.g., point P5) and reflected again from the rear face of the paraboloidal mirror portion 722B (e.g., point P6), to be emitted from the light exiting surface of the diffused reflection base material 72. At this time, the light rays are diffused in the vertical direction of the screen.

Those of the light rays L2 that reach the paraboloidal mirror portion 722B of one of the reflecting mirrors 722 are reflected from the inner surface thereof (e.g., points P1, P3) and reflected again from the rear face of the parabolic cylinder mirror portion 722A of the adjacent one of the reflecting mirrors 722 (e.g., points P3H, P4), to be emitted from the light exiting surface of the diffused reflection base material 72. At this time, the light rays are diffused in the vertical and horizontal directions of the screen.

Figure 13:
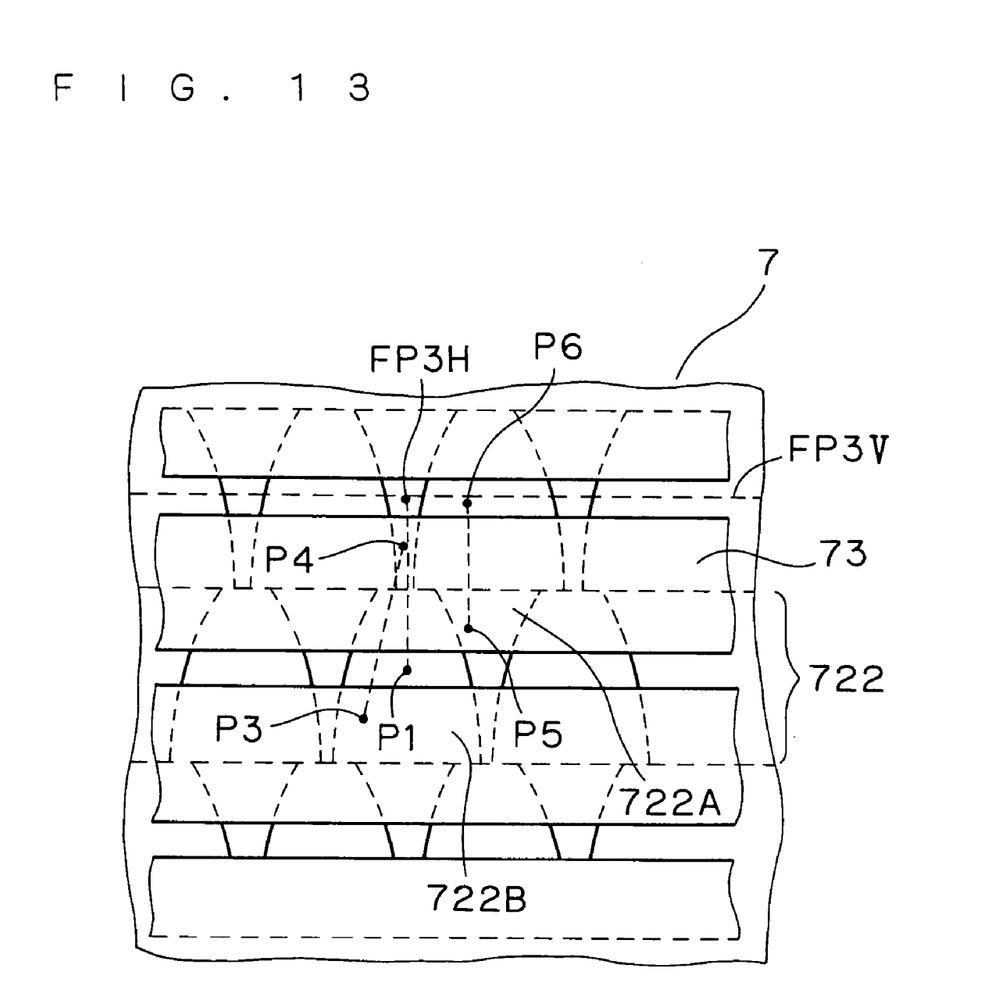
FIG. 13 shows the diffusion sheet viewed from a light-exiting side.

FIG. 13 shows the diffusion sheet 7 viewed from the light exiting surface. As shown, the black stripes 73 of similar structure as described in the second preferred embodiment are provided on the light exiting surface of the diffused reflection base material 72. Focal points FP3V of the parabolic cylinder mirror portion 722A are arranged in a line at spaces between the black stripes 73.

All of projected light rays entering at the light incident surface of the diffused reflection base material 72 are emitted passing through the focal point FP3V or the vicinity thereof. Reducing the space between the black stripes 73 within such a range that almost all of light rays can pass through can achieve high contrast. Light rays passing through the space between the black stripes 73 travel with directivities in the vertical and lateral directions of the screen.

Photodiffusion characteristics of the diffusion sheet 7 as a whole will be described in more detail.

When light travels out of the second transparent medium 723 through the light exiting surface of the diffusion sheet 7 to the air outside, the direction of travel is changed according to the law of refraction. Therefore, the directivity of the diffusion sheet 7 is determined in consideration of the amount of change.

An angle made by the direction of the normal to the light exiting surface of the diffusion sheet 7 and the direction of travel of light is indicated by θ1 in the transparent media of the diffusion sheet 7 and by θout in the air outside the diffusion sheet 7. The refractive index of the first transparent medium 721 and second transparent medium 723 is indicated by N1. Then, the relational expression N1×SIN(θ1)=SIN(θout) holds, according to the law of refraction, where the refractive index of air is assumed as one.

Here, assuming that the refractive index N1 of the transparent media is 1.5, conditions for a directivity of 90 degrees at full width at half maximum of light distribution in the lateral direction of the screen and a directivity of 45 degrees at full width at half maximum of light distribution in the vertical direction of the screen will be considered, by way of example. In this case, the angle θout of a light ray at half maximum of light distribution may be 45 degrees and 20 degrees at half widths at half maximum in the respective directions. Then, derived from the above relational expression is that θ1 may be 28 degrees at half width at half maximum in the lateral direction and 13 degrees at half width at half maximum in the vertical direction in the media.

In the lateral direction, diffusion by the paraboloidal mirror portion 722B is considered. Thus, divergence along the rotation axis by the paraboloidal mirror portion 722B is set at 56 degrees at a full width at half maximum since 28×2=56 in the above example.

In the vertical direction, diffusion by the parabolic cylinder mirror portion 722A is mainly considered. The converging angle of the parabolic cylinder mirror portion 722A is set to be 13×2=26, i.e., 26 degrees at full width at half maximum.

At this time, it is possible to enlarge a region of the parabolic cylinder mirror portion 722A that reflects a light ray outgoing angularly upwardly in consideration of re-reflection by the paraboloidal mirror portion 722B, so that light intensity differs when viewed from top and bottom of the screen. For instance, in FIGS. 11 and 12, extending the parabolic cylinder mirror portion 722A in the direction viewed from the point P1 to P3 (in other words, forming the lower portion of the parabolic cylinder mirror portion 722A having the diffusion function mainly in the vertical direction to be greater than the upper portion thereof) can increase light diffusion in a slightly upward direction on the screen in FIG. 11.

As described, adjusting the shape and occupation ratio of the parabolic cylinder mirror portion 722A and paraboloidal mirror portion 722B, a required directivity (diffusibility) can be obtained.

To reduce scintillation or to achieve higher contrast in the diffusion sheet 7, the second transparent medium 723 may contain a diffusion material, or may be subjected to ND coloring, or may additionally be provided with a reflection reducing element. Alternatively, an ND colored plate (not shown) may be joined to the front side of the black stripes 73.

The periodic interval at which the reflecting mirrors 722 are formed, the angle at half width at half maximum, and the refractive index N1 of the first transparent medium 721 and second transparent medium 723 are not limited to the above-described numerical values, but may be of values close to the above-described values, as a matter of course.

The rear projection screen and diffusion sheet 7 of the above construction can achieve the following advantages in addition to those described in the first preferred embodiment.

First, since the reflecting mirrors 722 of the diffusion sheet 7 diffuse light in a plurality of directions, diffusion can be performed using reflection by the single diffusion sheet 7. Therefore, the relatively simple construction can prevent the occurrence of ghosts and blurred images in a plurality of directions due to reflected light caused by refraction, contributing to improved clarity of images.

Through continuous steps as described in the first preferred embodiment, the diffusion sheet 7 can be manufactured in a short time avoiding unnecessary operations, and hence, at low costs.

That is, the first transparent medium 721 can be formed of UV molding resin or the like by using a roller-like rotation mold (not shown) on one main surface of the transparent sheet 71 made of a soft rolled material. At this time, preparing a sheet material which is long in the lateral direction of the screen and using a rotation mold of width equal to or greater than the screen height, the transparent sheet 71 and first transparent medium 721 continuously joining each other in the lateral direction of the screen can be manufactured continuously.

Particularly, with the construction according to the third preferred embodiment, the reflecting mirrors 722 extend in the lateral direction of the screen and in the widthwise direction of the sheet material. Therefore, manufacture of the rotation mold is easier than in the construction having cylindrical lenses or mirrors extending in the vertical direction of the screen as in conventional techniques or the first preferred embodiment of the present invention.

Further, since the screen height is usually ¾ or 9/16 of the screen width, a small rotation mold having such a size in the axial direction that conforms the screen width can be used. Therefore, manufacture can be performed with economical equipment.

Variant

In the above-described first to third preferred embodiments, the reflecting mirrors 322, 622 and 722 may be formed by a curved surface approximated by a flat plane of small area. The irregularities of the paraboloidal mirror portion 722B with respect to the parabolic cylinder mirror portion 722A may be reduced by moving the center of rotation of the paraboloidal mirror portion 722B close to the paraboloidal mirror portion 722B to reduce its curvature and reducing the area of each paraboloidal mirror portion 722B.

In these cases, a rotation mold for forming the reflecting mirrors 322, 622 and 722 can be manufactured easily.

Other shapes than those of the reflecting mirrors 322, 622 and 722, if only they have focal points, may be adopted as elements for the reflecting mirrors 322, 622 and 722.

Further, the Fresnel lens sheet 4 is formed separately from the diffusion sheet 3, 6 or 7 in the above preferred embodiments, but may be formed integrally with the diffusion sheet 3, 6 or 7. In this case, molding a Fresnel lens on the light incident surface of the transparent sheet 31, 61 or 71 by using a Fresnel lens mold (not shown) and UV resin allows the rear projection screen 2, 2B or 2C to have an integral structure.

While the invention has been shown and described in detail, the foregoing description is in all aspects illustrative and not restrictive. It is therefore understood that numerous modifications and variations can be devised without departing from the scope of the invention.

What is claimed is:

1. A diffuser panel for a rear projection screen for diffusing light, comprising:
   first reflecting elements for condensing incident light to substantially one spot or one line, periodically provided in at least one direction between a light incident surface and a light exiting surface; and second reflecting elements for bending principal axes of light rays reflected from said first reflecting elements to the direction of the normal to said light exiting surface.

2. The diffuser panel according to claim 1, further comprising:
a plurality of diffuser panels including said first reflecting elements, wherein
said plurality of diffuser panels overlap one another with directivities of diffusion different from one another.

3. The diffuser panel according to claim 1, wherein said first reflecting elements are each partly formed in a quadric surface having a focal point.

4. The diffuser panel according to claim 1, further comprising
curved reflecting mirrors, each having a concave mirror part on an inner surface thereof and a convex mirror part on an outer surface thereof, wherein
each of said first reflecting elements is said concave mirror part, and each of said second reflecting elements is said convex mirror part, and
a light ray reflected from one of said first reflecting elements of one of said reflecting mirrors is reflected from one of said second reflecting elements of an adjacent one of said reflecting mirrors.

5. The diffuser panel according to claim 1, further comprising
a light absorbing member in a region through which no projected light ray passes.

6. The diffuser panel according to claim 5, wherein
said light absorbing member is provided on said light exiting surface.

7. The diffuser panel according to claim 1, further comprising
a transparent portion mixed with a light diffusion material.

8. The diffuser panel according to claim 1, wherein
said first reflecting elements are formed of a metal film.

9. The diffuser panel according to claim 1, wherein
said second reflecting elements are formed of a metal film.

10. The diffuser panel according to claim 1, further comprising
a reflection reducing member on at least one of said light incident surface and said light exiting surface.

11. The diffuser panel according to claim 1, further comprising
a neutral density colored layer.

12. The diffuser panel according to claim 1, wherein
at least either of said first reflecting elements and said second reflecting elements are enclosed by a transparent medium.

13. The diffuser panel according to claim 1, wherein
at least one of said light incident surface and said light exiting surface has a flat region.

14. A rear projection screen, wherein
said light incident surface of said diffuser panel for a rear projection screen recited in claim 1 is formed flat, and
a Fresnel lens is provided on said light incident surface.

15. The diffuser panel according to claim 1, wherein
a flat member is joined integrally with at least one of said light incident surface and said light exiting surface.

16. A diffuser panel for diffusing light in a rear projection screen, comprising:
a diffuser panel including first reflecting elements, for condensing light to substantially one spot or one line, periodically provided in at least one direction between a light incident surface and a light exiting surface, wherein
said first reflecting elements are a plurality of types of reflection regions having different directivities of diffusion provided periodically.

17. A diffuser panel for a rear projection screen for diffusing light, comprising:
first reflecting elements for condensing incident light to substantially one spot or one line, periodically provided in at least one direction between a light incident surface and a light exiting surface wherein
said first reflecting elements are periodically provided at an interval smaller than a pixel size in the direction that said first reflecting elements are provided.

* * * * *